Nov. 12, 1940.           W. A. CLARK           2,221,507
PAD OR COVERING FOR SPRING STRUCTURES
Filed May 29, 1939
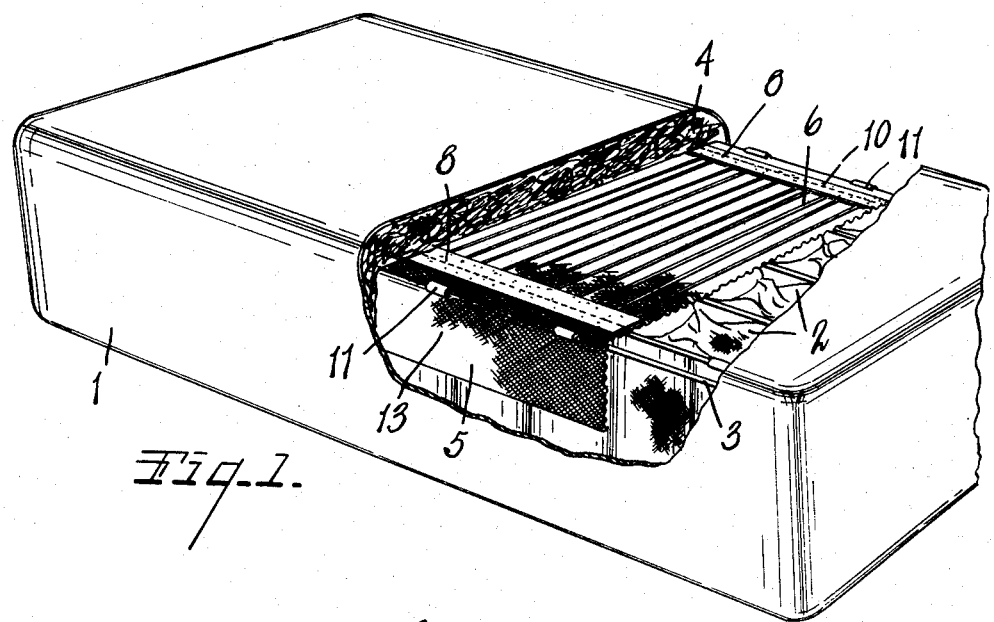
Fig. 1.
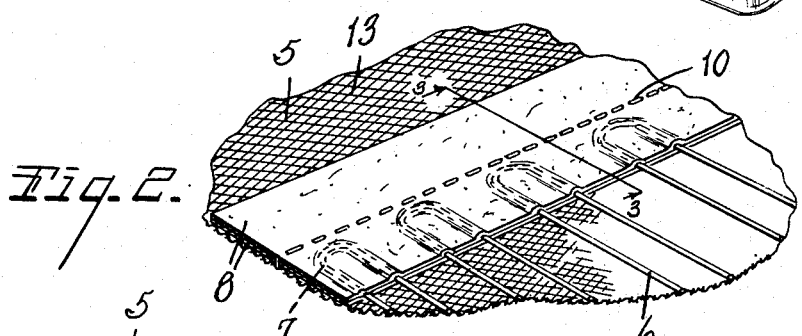
Fig. 2.
Fig. 3.
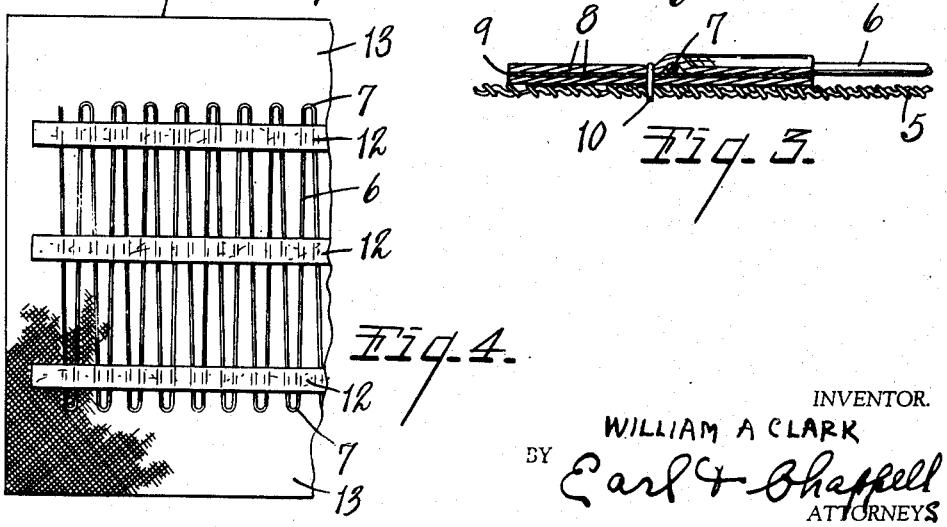
Fig. 4.
INVENTOR.
WILLIAM A CLARK
BY Earl & Chappell
ATTORNEYS Patented Nov. 12, 1940

2,221,507

UNITED STATES PATENT OFFICE 2,221,507

PAD OR COVERING FOR SPRING STRUCTURES

William A. Clark, Detroit, Mich., assignor to L. A. Young Spring & Wire Corporation, Detroit, Mich.

Application May 29, 1939, Serial No. 276,261

2 Claims. (Cl. 5—354)

This invention relates to improvements in pads or coverings for spring structures.

The main objects of my invention are:

First, to provide a reinforced fabric pad adapted to constitute an upholstery supporting cover for spring structures such as automobile seat cushions, mattresses, and the like, which is highly efficient for its purpose, and flexible and yieldable, although supporting the top upholstery substantially throughout.

Second, to provide a reinforced fabric for the purpose stated which may be readily and inexpensively applied to the spring structure.

Third, to provide a reinforcing fabric having the aforesaid advantages which may be produced very economically and is strong, durable and noiseless in use.

Further objects relating to details and economies of my invention will definitely appear from the description to follow. The invention is defined in the claims.

A structure embodying the features of my invention is illustrated in the accompanying drawing, wherein:

Fig. 1 is a fragmentary perspective view of an automobile seat cushion, being partially broken away to illustrate the upholstery supporting fabric or cover of my invention.

Fig. 2 is an enlarged perspective view more clearly illustrating details of construction of the cover in accordance with my invention.

Fig. 3 is a fragmentary view in section on a line corresponding to line 3—3 of Fig. 2.

Fig. 4 is a fragmentary plan view illustrating a reinforcing pad or cover in accordance with a modified embodiment of my invention.

In the embodiment of my invention illustrated in Figs. 1, 2 and 3, the reference numeral 1 indicates an automobile seat cushion having a spring structure 2, the springs being preferably of pocketed type, a top border frame 3, and padded upholstery 4 provided with a skirt which is suitably secured to the bottom of the cushion in a manner not illustrated.

The reinforced upholstery supporting cover or fabric mat of my invention comprises a sheet or strip of fabric 5 of suitable dimensions and preferably of a coarsely woven fabric, burlap having been found to be satisfactory for the purpose. This sheet or strip is reinforced by an assembly made up of a plurality of parallel resilient wire strands 6 preferably formed of a single piece of wire bent zigzag to bring the strands into substantially parallel spaced relation, each strand being connected to an adjacent strand by the end bends or bights 7.

The wires 6 have the ends thereof secured in the desired spaced relation by a pair of opposed tapes 8 provided on their adjacent surface with adhesive 9 serving to cement the strands to the tapes in desired spaced relation, as well as to secure the tapes 8 to one another. Such pairs of tapes are applied to each side of the assembly of wire strands 6. In applying the cover or mat to the springs it is only necessary to cut off a suitable length of the so assembled and taped strands and lay the same on the fabric sheet or strip in the desired position. The tapes are then secured to the fabric sheet 5 by stitching 10, after which the reinforced sheet is laid on the spring unit 2 and secured to the top border frame 3 by clips 11 or the like.

The tapes 8 are preferably of a suitable fabric having a coating of a dry adhering adhesive such as rubber latex or the like applied thereto, or it may be quite satisfactory in certain cases to utilize other types of material for the tapes and a different adhesive; hence, I do not wish to be unduly limited in this respect.

Although the continuous length of wire bent in zigzag as illustrated in the figures has the decided advantage that a suitable length thereof may be produced by merely cutting off the tapes and wire, it is also possible to employ other types of wire elements, for example, a plurality of spaced individual U shaped or straight wires so long as they are connected in longitudinally spaced relation by tapes in accordance with the above description.

In Fig. 4 I illustrate a modified embodiment of my invention wherein the zigzag bent wires 6 are laid directly on the fabric sheet 5 and secured thereon in proper spaced relation by adhesive tapes 12 applied directly on top of the wires and adhered to the latter and to the fabric sheet 5, this construction being an exceedingly inexpensive one although quite effective when applied in an automobile seat cushion or the like.

In each case the cover unit or pad 5 is provided with a sufficiently large border section 13 to enable the same to be lapped over and secured to the border frame 3 by the clips or other elements 11.

The aforesaid reinforced fabric is very strong and durable while at the same time it is amply yieldable to permit the springs to perform their intended functions. Furthermore, the securing tapes employed serve to damp and prevent noise of the individual strands such as is likely to be caused by their movement in use.

I have illustrated and described my invention in embodiments which I have found very satisfactory and practical. I have not attempted to illustrate or describe various modifications and adaptations which I contemplate as it is believed this disclosure will enable the embodiment or adaptation of my invention as may be desired.

Having thus described my invention what I claim as new and desire to secure by Letters Patent is:

1. A reinforced upholstery supporting mat or cover for spring structures comprising a sheet of fabric having disposed thereon a plurality of reinforcing wire strands formed from a continuous length of wire bent zigzag whereby the adjacent strands are connected and uniformly spaced by U-shaped bights, and means for securing said strands to said fabric comprising pairs of tapes disposed transversely of said strands with the bights thereof between the tapes, said tapes having adhesive thereon to grip and secure said bights and to secure the tapes relative to one another, and stitching securing said tapes to said fabric, said tapes projecting substantially laterally outwardly from said bights to facilitate stitching of the tapes to the fabric.

2. A reinforced upholstery supporting mat or cover for spring structures comprising a sheet of fabric having disposed thereon a plurality of reinforcing wire strands formed from a continuous length of wire bent zigzag whereby the adjacent strands are connected and uniformly spaced by U-shaped bights, and means for securing said strands to said fabric comprising pairs of tapes disposed transversely of said strands at the bights thereof, said tapes having adhesive thereon to grip and secure said strands, and means for securing said tapes to said fabric, said tapes being adhered to said bights and to one another between the bights, and projecting substantially laterally outwardly from the bights to facilitate securement of the tapes to the fabric.

WILLIAM A. CLARK.